Patented Dec. 26, 1933

1,940,710

UNITED STATES PATENT OFFICE 1,940,710

ALKACYL - ALKOXYALKACYL ESTERS OF CELLULOSE AND PROCESS OF MAKING THE SAME

Henry Dreyfus, London, England

No Drawing. Application March 21, 1929, Serial No. 348,977, and in Great Britain March 28, 1928

27 Claims. (Cl. 260—101)

This invention relates to the manufacture of new cellulose derivatives, to the production therefrom of artificial silks, horsehair or other artificial fibres, films, plastic masses, moulded articles, moulding powders, varnishes, solutions and to other applications thereof and to the colouring or other treatment of the cellulose derivatives or materials or articles made therefrom.

The new cellulose derivatives which are mixed derivatives are manufactured according to the present invention by the substitution of a part of the hydroxy groups of the cellulose molecule by one or more alkoxy-aliphatic acidyl groups, that is to say the acid groups of alkyl ethers of hydroxy aliphatic acids or substitution products thereof, and by the substitution of part or the whole of the remaining hydroxy groups by means of fatty acidyl groups. For convenience the new cellulose derivatives will be termed hereinafter mixed alkacyl-alkoxyalkacyl derivatives of cellulose. In the case of acetyl-alkoxy-acetyl derivatives they will have the formula

$C_6H_{10-m-n}O_{5-m-n}.[O.CO.CH_3]_m.[O.CO.CH_2.OR]_n$, where $m$ is the degree of acetylation, $n$ the degree of alkoxyacetylation and R an alkyl group.

The acylation may be carried to the mono-, di- or tri-acyl stage or to a higher stage of acylation or to any intermediate stage but the most valuable commercial results are obtained when the reaction is carried to the tri-acyl stage or to between the di- and tri-acyl stage. The acylation is best effected by using the anhydrides of the ethers of hydroxy aliphatic acids and with the anhydrides of the fatty acids. In general the best method of obtaining the new mixed derivatives is to acylate with the anhydrides of the fatty acids, e. g. acetic anhydride, subsequent to the acylation with the anhydrides of the ethers of hydroxy aliphatic acids, for instance with methoxyacetic anhydride. If formate is to be the fatty acid radicle, formic acid will be employed as acylating agent and the acylation will be carried out separately from the alkoxy-acylation.

The ether acid anhydrides, hereinafter in the claims referred to as alkoxyalkacidic anhydrides, may be derived from any convenient alkyl ethers of hydroxy aliphatic acids. I prefer however to employ the anhydrides corresponding to the low alkyl ethers, such as the methyl or ethyl ethers, of the lower mono-hydroxy aliphatic acids, such as glycolic and lactic acid. The anhydrides may be prepared by any convenient method. For example they may be prepared from the sodium, potassium or other metallic salts of the acids by treatment with sulphur and chlorine or sulphur chlorine compounds as described in my British Patent No. 313,233, with oxides of sulfur and chlorine or the compounds of oxides of sulfur with chlorine as described in my British Patent No. 313,235, or with phosgene as described in my British Patent No. 313,234 or by the thermal decomposition of the acids themselves as described in my British Patent No. 317,342. As anhydrides of fatty acids I may employ acetic anhydride, propionic anhydride, butyric anhydride or the like, but here again I find that products of the greatest value are obtained with the lower members of the series and particularly acetic anhydride.

As initial materials for acylation according to the present invention cotton or any other celluloses or near conversion products thereof may be employed, or bamboo, esparto or wood pulps from which the lignin, pentosan, resin and like constituents have been substantially removed, as for example in sulphite pulp, soda pulp or sulphate pulp.

The cellulose materials may be treated, prior to the acylation, with organic acids in large or small quantities and particularly with lower fatty acids such as formic and acetic acid or with the lower alkoxy-fatty acids such as the methyl or ethyl ethers of glycolic acid, to increase their reactivity. Chemical wood pulps are preferably subjected to an alkaline purifying treatment as described in my U. S. Patent No. 1,711,110, followed by the treatment with organic acids, prior to the acylation. The alkaline purifying treatment may for example be performed with caustic alkali of low concentration, such as 3% or under, with heating or boiling, or with caustic alkali of high concentration, such as 5-10% or more, in the cold or with only slight heating.

The pretreatment with organic acids may be carried out in any convenient manner. For example, the cellulosic materials may be pretreated with concentrated or dilute acids, particularly formic or acetic acid, as described in my French Patent No. 565654, or as described in my British Patent No. 263,938, with the vapours of the acids, the vapours being employed alone or mixed with air or other inert gas. After the treatment with organic acids, the cellulosic materials may be subjected to a stream of air or other inert gas or to suction or vacuum to remove the organic acids wholly or partially. If, as is preferred, the methoxy-acetyl or other alkoxy-alkacyl groups are introduced before the fatty acid groups, a pretreatment with methoxyacetic or other alkoxy-aliphatic acid is preferred. Formic acid, acetic acid or other fatty acids if used in a pretreatment immediately prior to alkoxyacylation should be substantially removed before the acylation is effected. If for the pretreatment an acid is used which will serve as a solvent diluent in the subsequent acylation, or which corresponds to the anhydride to be employed in the subsequent acylation, for instance, methoxyacetic acid, or acetic acid, its removal is of course unnecessary.

Another type of pretreatment, which I have found very efficacious for rendering the cellulosic material more reactive is that described in my British Patent No. 312,098. The cellulosic material is treated with hydrochloric or other hydrohalide acid or with mixtures thereof. The acid is most advantageously employed in a proportion of 5–10% (corresponding to about 15–30% of commercial acid in the case of hydrochloric acid.) The aqueous acids may be distributed evenly over the cellulosic material, for instance by spraying the material in a drum or mixer, the cellulosic material being allowed to stand with occasional turning to ensure impregnation until a product capable of rapid acylation. This type of pretreatment is most valuable when hydrochloric or other hydrohalide acid is to be employed in the subsequent acylation as hereinafter described. The metallic halide catalysts referred to below for use in conjunction with hydrochloric or other hydrohalide acid may moreover be used alone or together with the acid as pretreating agents.

The pretreatment with hydrohalide acids may furthermore be combined with a pretreatment with organic acids as described above, the two treatments being conducted simultaneously or successively. Furthermore the pretreatment with organic acids may be combined with a pretreatment with other mineral acids, for example sulphuric acid.

The introduction of the alkoxyalkacyl radicle or radicles may be effected by any of the methods described in my British Patent No. 314,918 for the production of alkoxyalkacyl derivatives of cellulose while the methods to be employed for the introduction of the acetyl or other fatty acid radicles may be those known in the art. As indicated above it is preferred to introduce the alkoxyalkacyl radicle or radicles before the fatty acid radicle or radicles. If however the reverse procedure be adopted a fatty acid ester of cellulose, for example cellulose acetate or formate, of low ester content may be treated for the introduction of alkoxyalkacyl radicles by the methods described in the said British Patent No. 314,918 for the alkoxyalkacylation of cellulose materials.

Fibres, fabrics or the like made of or containing cotton or other cellulosic material may be acylated by means of the processes of the present invention by carrying out the acylation so that the derivatives produced do not go into solution.

As indicated in the said British Patent No. 314,918 the treatment with the anhydrides should be conducted in presence of a suitable catalyst. Sulphuric acid or organically substituted sulphuric acids such as benzene sulphonic acid, bisulphates e. g. sodium bisulphates, phosphoric acid, sulphuryl chloride, zinc chloride and the like may be employed. Metallic halides, for example the chlorides of iron (especially ferric), tin (stannic), manganese, copper, nickel or cobalt used in conjunction with hydrochloric or other hydrohalide acids give very useful results. Stannic and ferric chlorides are even capable of giving satisfactory acylation without hydrochloric acid. A pretreatment of the cellulosic material with organic and/or hydrohalide acids is in all cases to be recommended, but in the case of using as catalysts ferric halides without hydrohalide acids it is particularly desirable since the temperatures which would otherwise be necessary to effect complete acylation are unduly high.

The quantity of catalyst to be employed will vary with the catalyst selected, with the type of cellulosic material to be treated and with the temperature and other conditions of the acylation. Sulphuric acid should preferably be employed in proportions under 15% calculated on the weight of the cellulose and especially in proportions of 1 to 10%, while the ferric chloride, stannic chloride, or other halides given above should preferably be employed in a proportion of 5 to 20% on the weight of the cellulose, or if used in conjunction with hydrochloric or other hydrohalide acid both the halide itself and the hydrohalide acid should preferably be present in proportions of between 5 to 15% on the weight of the cellulose. The whole of the catalyst required may be incorporated initially in the cellulose or in the acylating mixture, whether this contains one or more of the anhydrides necessary for the production of the mixed derivatives, or the catalysts may be added in portions at intervals, particularly when the acylation is carried out in two stages using one type of anhydride first and then the other.

In order to avoid degradation of the cellulose molecule the acylation is preferably conducted at temperatures not substantially exceeding 50° C. With sulphuric acid or like strong catalysts the most valuable derivatives are obtained if the acylation is performed at low temperatures, for example below atmospheric e. g. 10° C. to 5° or 0° C. or lower, at ordinary temperatures, or at temperatures, such as 20° to 30° C. not substantially above atmospheric. Greater care will in general be necessary in the control of the temperature in the case of using sulphuric acid as catalyst as compared with using the halide catalyst referred to above. For example when using ferric chloride as catalyst heating may be applied in the acylation without impairing the quality of the products. The control of the temperature of the reaction is considerably facilitated if the acylating mixture is cooled before the introduction of the cellulosic material. This precooling may be carried to between 0° and 5° C. but is preferably carried to below 0° C.

The following examples are intended to illustrate the invention but not to limit it in any way:—

*Example 1*

100 parts by weight of cotton cellulose are introduced into a mixture precooled to about 0° to 5° C., consisting of 600 parts of methoxyacetic acid, 400 parts of methoxyacetic anhydride and 0.4 parts of sulphuric acid. The temperature is allowed to rise during the acylation to about normal atmospheric temperature, say 15° C. After about 20 hours and before solution of the fibre has taken place, the mass is removed from the mixture squeezed and washed. The mass is then introduced into a mixture of 500 parts of glacial acetic acid, 150 parts of acetic anhydride and 7 parts of sulphuric acid. The further reaction is allowed to proceed while stirring and cooling until solution is complete, when the mixed cellulose acetate-methoxyacetate may be precipitated by addition of water or other precipitating liquid.

It is soluble in acetic acid and in chloroform-alcohol. It may be further treated as described below for the purpose of changing its solubility characteristics or such secondary treatments may be applied to the acylation solution before separation of the cellulose derivative.

Example 2

100 parts by weight of cotton cellulose are treated with an acylating mixture consisting of 600 parts of ethoxyacetic acid, 470 parts of ethoxyacetic anhydride and 0.4 part of sulphuric acid. Both the treatment with the acylating mixture and the subsequent acetylation are conducted as described in Example 1 above. The mixed cellulose acetate-ethoxyacetate has similar properties to the cellulose acetate-methoxyacetate prepared in Example 1.

Example 3

100 parts by weight of cotton cellulose are steeped for about 12 hours in the cold in 500 parts of methoxyacetic acid. A solution of 8 parts of sulphuryl chloride in 400 parts of methoxyacetic anhydride are then added and the reaction allowed to proceed for about 10 hours at 30–40° C. After this time and before solution is complete, the mass is removed from the mixture, squeezed and washed and entered into a mixture of 500 parts of glacial acetic acid, 200 parts of acetic anhydride and 10 parts of sulphuric acid. The acetylation and separation and/or secondary treatment are then effected as in Example 1. The product has similar properties.

Though the invention has been described more particularly with reference to the production of mixed derivatives of low fatty acids such as acetic acid on the one hand and of low alkyl ethers of low hydroxy aliphatic acids, it is to be understood that it includes the production of mixed cellulose derivatives containing on the one hand other fatty acid groups such as those of propionic acid and its homologues and on the other hand acid groups of other ethers of hydroxy fatty acids, for example of the propyl and other ethers of glycolic and lactic acids, of the methyl, ethyl, propyl and other ethers of hydracrylic acid and of homologues of these acids, of the dimethyl, ethyl, propyl and other ethers of glyceric acid and also of substitution products of ethers of hydroxy acids, such for example as the monomethyl, ethyl and propyl ethers of glyceric acid.

I have further found that as in the case of the alkoxyalkacyl derivatives of British Patent No. 314,918 the solubilities of the new mixed alkacyl-alkoxyalkacyl derivatives of cellulose may be changed or varied, that is to say the primary acylation products may be transformed into products which are soluble in solvents in which the primary products are insoluble, by subjecting them to suitable secondary treatments after the acylation is complete and my invention includes subjecting the new cellulose derivatives to such secondary treatments. Treatment of the new cellulose derivatives with hydrolytic or hydrating agents such as inorganic or organic acids or acid salts or salts having an acid reaction (e. g. ferric chloride) or with aromatic amines, for instance aniline, or salts thereof at ordinary or raised temperatures is very effective in thus transforming them into products exhibiting solubilities different from those of the primary acylation products. These secondary treatments may be carried out in the primary acylation solutions or suspensions after destroying or eliminating any remaining acylating agent, or the derivatives either precipitated from the primary acylation solutions or those obtained other than in solution may be dissolved or suspended and then subjected to the secondary treatments. The treatment should be stopped when the required solubility has been reached. In conducting the secondary treatments in the primary acylation solutions, in most cases the acylation catalysts themselves will be sufficient to effect the change in solubility and it is only necessary to eliminate or destroy any remaining acylating agent and to allow the derivatives to remain in solution with the catalysts at ordinary or raised temperature until the required solubility has been reached. When the acylation has been performed in presence of metallic halides, for example ferric chloride or stannic chloride, with or without hydrochloric or other hydrohalide acids, it is found particularly advantageous to conduct the secondary treatments in the primary acylation solutions or suspensions without neutralizing or eliminating these catalysts or catalyst mixtures. Particularly is this the case when hydrochloric or other hydrohalide acid has been used. However, if such an acid has not been employed in the acylation the secondary treatment may be accelerated by adding it after the acylation is complete.

While the secondary treatments of the primary acylation products are with advantage conducted at ordinary or moderate temperatures, the reaction may, if desired, be quickened by heating up to relatively high or high temperatures, even up to 80° or 100° C. but in such cases the presence of free mineral acids is preferably avoided.

British Patent No. 314,918 gives an example of a suitable secondary treatment and a similar secondary treatment may be applied to the acylation solutions obtained in each of the above examples.

The new cellulose derivatives either in their primary acylation solutions and with or without secondary treatments or as primary or secondary derivatives in solution in suitable solvents may be employed for the production of artificial silks, horsehair or other fibres, films (photographic, cinematographic or otherwise) and pellicles and they may further be used for the production of celluloid substitutes or other thermoplastic masses or articles, moulding powders, varnishes, lacquers, solutions, etc. If sulphuric acid has been employed in the acylation, it should be removed as completely as possible before utilizing the cellulose derivatives.

The new cellulose derivatives may be extruded into filaments, threads or films by either wet or dry spinning processes, and for this purpose they may be employed in the form of solutions of relatively low concentration, for instance 5 to 8% or of medium concentration, for example 10 to 20% or of high concentration containing over 20% e. g. 25 to 30% or more.

In wet spinning solutions of the new cellulose derivatives the precipitating baths may, if desired, consist wholly of a non-solvent liquid or liquids, but it is found that improved results are obtained if to the non-solvent liquid or liquids, e. g. water, a proportion of one or more solvent liquids be added. Any suitable wet spinning apparatus may be used, for example, apparatus of the type employed in the spinning of viscose, cuprammonium and nitrocellulose artificial silks.

For dry spinning artificial silks or fibres, of whatever type or cross-section, e. g. flattened, rounded, hollow, cellular or voluminous, from solutions of the new cellulose derivatives, the apparatus described in prior U. S. Patent No. 1,602,125, U. S. Patent No. 1,731,317, U. S. Patent No. 1,541,104, British Patent No. 300,998 or 304,675, or any other suitable apparatus may be employed for the production of cellular, tubular or other voluminous filaments, the processes described in my British Patent Nos. 317,097 and 317,098 may be employed.

For the production of artificial silks or fibres, films etc. as well as for the production of thermoplastic masses, articles and the like, plasticizing or softening agents or high boiling solvents, for example aryl sulphonamides or their alkyl derivatives, may be incorporated in the derivatives or in their solutions.

The present invention includes all such uses of the new cellulose derivatives. Furthermore for such uses the new cellulose derivatives may be mixed with known cellulose esters, e. g. with cellulose acetate, or with cellulose ethers.

The present invention further includes the mordanting, loading and colouration (e. g. dyeing, printing and stencilling) of the new products or of materials containing them. For example it is found that the new cellulose derivatives or products containing them may be mordanted or loaded or dyed, if the mordanting, loading or dyeing solutions or preparations be applied under such conditions that swelling of the cellulose derivatives takes place. For example the materials may be treated with swelling agents, e. g. thiocyanates, acetone etc., previous to or simultaneous with the application of the mordanting, loading or dyeing solutions or the mordanting or loading solutions may be applied under such conditions as to act as swelling agents. The materials thus mordanted acquire an affinity for mordant dyestuffs and also if loaded for many substantive or acid dyestuffs.

The new cellulose derivatives without treatment of any sort exhibit an affinity for basic dyestuffs which may be applied thereto in the form of salts, such for example as the hydrochloride or acetate.

An affinity for substantive dyestuffs and for vat and sulphur colours may be imparted to materials containing the new cellulose derivatives by superficially or partially saponifying them.

Furthermore the new alkacyl-alkoxyalkacyl derivatives of cellulose may be coloured with water-insoluble or relatively water-insoluble colouring matters or compounds applied in the form of aqueous suspensions or dispersions. Such dispersions may be obtained by grinding, by dissolving the colouring matters or compounds in solvents and mixing with water or by treatment with dispersing agents. For examples of colouring matters and compounds and of suitable dispersing agents reference is made to prior U. S. Patent No. 1,723,271.

What I claim and desire to secure by Letters Patent is:—

1. Mixed alkacyl-alkoxyalkacyl esters of cellulose.

2. Mixed acetyl-alkoxyacetyl esters of cellulose.

3. Mixed cellulose esters of the formula $$C_6H_{10-m-n}O_{5-m-n}.[O.CO.CH_3]_m[O.CO.CH_2OR]_n,$$

where $m$ is the degree of acetylation, $n$ the degree of alkoxyacetylation and R is an alkyl group containing up to 2 carbon atoms.

4. Mixed cellulose acetate-ethoxyacetates.

5. Mixed cellulose acetate-methoxyacetates.

6. Process for the manufacture of new mixed cellulose esters, comprising treating materials consisting essentially of cellulose separately with alkacylating agents and alkoxy-alkacylating agents in the presence of acylation catalysts.

7. Process for the manufacture of mixed alkacylalkoxyalkacyl derivatives of cellulose, comprising treating materials consisting essentially of cellulose separately with fatty acid anhydrides and with alkoxyalkacidic anhydrides, both in the presence of acylation catalysts.

8. Process for the manufacture of mixed alkacylalkoxyalkacyl derivatives of cellulose, comprising treating materials consisting essentially of cellulose first with alkoxyalkacidic anhydrides and then with fatty acid anhydrides, both in the presence of acylation catalysts.

9. Process for the manufacture of mixed alkacylalkoxyalkacyl derivatives of cellulose, comprising treating materials consisting essentially of cellulose first with alkoxyalkacidic anhydrides and then with fatty acid anhydrides, both in the presence of acylation catalysts and a liquid acylation medium.

10. Process for the manufacture of mixed acetylalkoxyacetyl derivatives of cellulose, comprising first treating materials consisting essentially of cellulose with alkoxyacetic anhydrides and then with acetic anhydride, both in the presence of acylation catalysts.

11. Process for the manufacture of mixed acetylalkoxyacetyl derivatives of cellulose, comprising first treating materials consisting essentially of cellulose with alkoxyacetic anhydrides, and then with acetic anhydride, both in the presence of acylation catalysts and a liquid acylation medium.

12. Process for the manufacture of mixed acetylalkoxyacetyl derivatives of cellulose, comprising treating materials consisting essentially of cellulose with acids to render them reactive and subsequently acylating first with alkoxyacetic anhydrides and then with acetic anhydride, both acylations being effected in the presence of acylation catalysts.

13. Process for the manufacture of mixed acetyalkoxyacetyl derivatives of cellulose, comprising treating materials consisting essentially of cellulose with acids to render them reactive and subsequently acylating first with alkoxyacetic anhydrides and then with acetic anhydride, both acylations being effected in the presence of acylation catalysts and a liquid acylation medium.

14. Process for the manufacture of mixed acetylalkoxyacetyl derivatives of cellulose, comprising treating materials consisting essentially of cellulose with organic acids to render them reactive and subsequently acylating first with alkoxyacetic anhydrides and then with acetic anhydride, both acylations being effected in the presence of acylation catalysts.

15. Process for the manufacture of mixed cellulose acetate-methoxyacetates, comprising first treating materials consisting essentially of cellulose with methoxyacetic anhydride and then with acetic anhydride, both in the presence of acylation catalysts.

16. Process for the manufacture of mixed cellulose acetate-methoxyacetates, comprising first treating materials consisting essentially of cellulose with methoxyacetic anhydride and then with acetic anhydride, both in the presence of acylation catalysts and a liquid acylation medium.

17. Process for the manufacture of mixed cellulose acetate-methoxyacetates, comprising treating materials consisting essentially of cellulose with organic acids to render them reactive and subsequently acylating first with methoxyacetic anhydride and then with acetic anhydride, both acylations being effected in presence of acylation catalysts and a liquid acylation medium.

18. Process for the manufacture of mixed cellulose acetate-methoxyacetates, comprising treating materials consisting essentially of cellulose with methoxyacetic acid to render them reactive and subsequently acylating first with methoxyacetic anhydride and then with acetic anhydride, both acylations being effected in presence of acylation catalysts and a liquid acylation medium.

19. Process for the manufacture of mixed alkacylalkoxyalkacyl esters of cellulose, comprising treating materials consisting essentially of cellulose separately with fatty acid anhydrides and with alkoxyalkacidic anhydrides both in the presence of acylation catalysts, and subjecting the resulting primary alkacylalkoxyalkacyl derivatives of cellulose to processes which change their solubility characteristics.

20. Process for the manufacture of mixed acetylmethoxyacetyl esters of cellulose, comprising treating materials consisting essentially of cellulose separately with acetic anhydride and with methoxyacetic anhydride both in the presence of acetyl-methoxyacetyl esters of cellulose to processes which change their solubility characteristics.

21. Process for the manufacture of mixed alkacylalkoxyalkacyl esters of cellulose, comprising treating materials consisting essentially of cellulose first with alkoxyacidic anhydrides, then with fatty acid anhydrides both in the presence of acylation catalysts, and subjecting the resulting primary alkacylalkoxyalkacyl esters of cellulose to processes which change their solubility characteristics.

22. Process for the manufacture of mixed acetylethoxyacetyl esters of cellulose, comprising treating materials consisting essentially of cellulose separately with acetic anhydride and with ethoxyacetic anhydride both in the presence of acylation catalysts, and subjecting the resulting primary acetyl-ethoxyacetyl esters of cellulose to processes which change their solubility characteristics.

23. Process for the manufacture of mixed alkacylalkoxyalkacyl esters of cellulose, comprising treating materials consisting essentially of cellulose separately with fatty acid anhydrides and with alkoxyalkacidic anhydrides both in the presence of acylation catalysts, and subjecting the resulting primary alkacylalkoxyalkacyl esters of cellulose to the action of acidic substances so as to change their solubility characteristics.

24. Process for the manufacture of mixed alkacylalkoxyalkacyl esters of cellulose, comprising treating materials consisting essentially of cellulose separately with fatty acid anhydrides and with alkoxyalkacidic anhydrides both in the presence of acylation catalysts, and subjecting the resulting primary alkacylalkoxyalkacyl esters of cellulose to the action of substances having mineral acidity so as to change their solubility characteristics.

25. Partially hydrolyzed mixed alkacyl-alkoxyalkacyl esters of cellulose.

26. Partially hydrolyzed mixed acetyl methoxyacetates of cellulose.

27. Partially hydrolyzed mixed acetyl-ethoxyacetates of cellulose.

HENRY DREYFUS.